United States Patent
Cook et al.

(10) Patent No.: US 7,536,853 B2
(45) Date of Patent: May 26, 2009

(54) HEATING SYSTEM FOR A VEHICLE HAVING AN EXHAUST SYSTEM

(75) Inventors: Anthony J. Cook, Fort Wayne, IN (US); Richard L. Malecki, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 11/424,913

(22) Filed: Jun. 19, 2006

(65) Prior Publication Data
US 2007/0289292 A1    Dec. 20, 2007

(51) Int. Cl.
*F01N 3/00* (2006.01)
(52) U.S. Cl. ............... 60/286; 60/284; 60/295; 60/298; 60/303; 60/320
(58) Field of Classification Search .......... 60/284, 60/286, 295, 297, 298, 303, 320
See application file for complete search history.

(56) References Cited

U.S. PATENT DOCUMENTS

| | | | | |
|---|---|---|---|---|
| 5,085,049 A | * | 2/1992 | Rim et al. | 60/274 |
| 5,711,149 A | * | 1/1998 | Araki | 60/278 |
| 6,319,484 B1 | * | 11/2001 | Shore et al. | 423/245.1 |
| 6,427,436 B1 | * | 8/2002 | Allansson et al. | 60/274 |
| 6,871,489 B2 | * | 3/2005 | Tumati et al. | 60/285 |
| 7,107,764 B1 | * | 9/2006 | Opris et al. | 60/297 |
| 7,278,411 B1 | * | 10/2007 | Fluga et al. | 123/568.12 |

FOREIGN PATENT DOCUMENTS

DE    10 2004 048 338 A1    10/2004

OTHER PUBLICATIONS

European Search Report, Jan. 30, 2009, European Patent Office.

\* cited by examiner

*Primary Examiner*—Binh Q. Tran
(74) *Attorney, Agent, or Firm*—Mark C. Bach; Jeffrey P. Calfa

(57) ABSTRACT

A heating system for use on an exhaust system having an exhaust gas passageway, the engine having a cooling system to circulate a cooling fluid to and from the engine, includes a fuel-dosing member for dosing fuel to the exhaust system to trigger a regeneration event. A particulate filter is located on the exhaust gas passageway downstream of the engine, and an oxidation catalyst member is located upstream from the particulate filter. The oxidation catalyst member oxidizes the fuel dosed to increase the temperature of the exhaust gases. The increased temperature causes a regeneration event at the particulate filter, which further increases the temperature of the exhaust gases. A heat exchanger is located downstream of the particulate filter for capturing heat from the exhaust gases. The heat exchanger has an inlet conduit and an outlet conduit for circulating the cooling fluid from the heat exchanger to the engine cooling system.

20 Claims, 1 Drawing Sheet

HEATING SYSTEM FOR A VEHICLE HAVING AN EXHAUST SYSTEM

BACKGROUND OF THE INVENTION

The present invention relates generally to heating systems in vehicles. More specifically, the present invention relates to a heating system utilizing the exhaust gases from a vehicle's engine.

Automotive vehicles having large interior compartments, such as buses, are difficult to heat, particularly in colder temperatures. Typically, the interior of the vehicle is heated by extracting heat from the vehicle's engine. However, in large automotive vehicles such as buses, this method is insufficient because the engine requires a prolonged amount of time to warm up. Frequently, the bus has to idle for upwards of 30-minutes before the engine is sufficiently warmed up, which consumes an excessive amount of fuel. Further, once the engine is warmed up, the amount of heat extracted from the engine is frequently insufficient to warm the large interior compartment.

Warming up the engine quickly, thus warming up the large interior compartment quickly, is beneficial for the passengers. Additionally, quickly warming up the engine in colder climates improves engine performance and engine life.

The problem of slow engine warm-up and insufficient heating of the large interior compartment has been addressed by adding fuel-fired heaters. Fuel-fired heaters are devices that take fuel from the fuel tank and that combust the fuel to derive heat. The resulting heat is used to heat up the coolant, which in turn provides heat for the interior compartment. However, there are disadvantages to using fuel-fired heaters, including containing an open flame within the heater, providing a housing on the chassis for the heater, providing the fluid conduits to and from the heater, and the high cost of manufacture.

Heat exchangers are also sometimes added to the engine exhaust system to remove heat from the exhaust gas and transfer it to the water or coolant circuit. However, for larger vehicles, such as buses, the heat exchangers are often insufficient because the normal engine exhaust temperatures are not high enough to adequately heat the large interior compartment.

Thus, there is a need for a heating system that provides an adequate amount of heat to a large interior compartment.

There is also a need for a heating system that warms up the large interior compartment in a short period of time.

There is a further need for a heating system that is of simple design and that can be inexpensively installed on a large vehicle.

BRIEF SUMMARY OF THE INVENTION

The above-listed needs are met or exceeded by the present heating system for use on an exhaust system having an exhaust gas passageway to emit exhaust gases from an engine to an outlet, the engine having a cooling system to circulate a cooling fluid to and from the engine, is provided. A fuel-dosing member doses fuel to the exhaust system to trigger a regeneration event. A particulate filter is located on the exhaust gas passageway downstream of the engine, and an oxidation catalyst member is located upstream from the particulate filter on the exhaust gas passageway. The oxidation catalyst member oxidizes the fuel dosed from the fuel-dosing member to increase the temperature of the exhaust gases. The increased temperature causes a regeneration event at the particulate filter. The regeneration event further increases the temperature of the exhaust gases. A heat exchanger is located downstream of the particulate filter on the exhaust gas passageway for capturing heat from the exhaust gases. The heat exchanger has an inlet conduit and an outlet conduit for circulating the cooling fluid from the heat exchanger to the engine cooling system.

An alternate embodiment of a heating system for use on a motor vehicle having an exhaust system with an exhaust gas passageway to emit exhaust gases from an engine to an outlet, is provided. The engine has a cooling system to circulate a cooling fluid to and from the engine. The heating system includes a fuel-dosing member for dosing fuel to the exhaust system to trigger a regeneration event. An oxidation catalyst member is located downstream of the engine on the exhaust gas passageway. A particulate filter is located downstream of the oxidation catalyst member on the exhaust gas passageway. A heat exchanger is located downstream of the particulate filter on the exhaust gas passageway for capturing heat from the exhaust gases, the heat exchanger having an inlet conduit and an outlet conduit for circulating the cooling fluid from the heat exchanger to the engine cooling system. At least one temperature sensor is located on the exhaust gas passageway for measuring the temperature of the exhaust gases, wherein when an exhaust gas temperature reaches a threshold minimum temperature to sustain a regeneration event, the engine initiates dosing of fuel to trigger a regeneration event at the particulate filter.

Another embodiment of a heating system for use on a motor vehicle having an exhaust system with an exhaust gas passageway to emit exhaust gases from an engine to an outlet, the engine having a cooling system to circulate a cooling fluid to and from the engine, includes an engine controller unit. The engine controller unit is associated with the engine for initiating a regeneration event. A fuel-dosing member is associated with the engine and is controlled by the engine controller for dosing fuel. A particulate filter is located on the exhaust gas passageway downstream of the engine. An oxidation catalyst member is located upstream from the particulate filter on the exhaust gas passageway, wherein the oxidation catalyst member oxidizes fuel dosed from the fuel injector to increase the temperature of the exhaust gases. The increased temperature of the exhaust gases causes the regeneration event at the particulate filter. The regeneration event further increases the temperature of the exhaust gases. A heat exchanger is located downstream of the particulate filter on the exhaust gas passageway for capturing heat from the exhaust gases. The heat exchanger has an inlet conduit and an outlet conduit for circulating the cooling fluid from the heat exchanger to the engine cooling system.

DETAILED DESCRIPTION OF THE INVENTION

Figure 1:
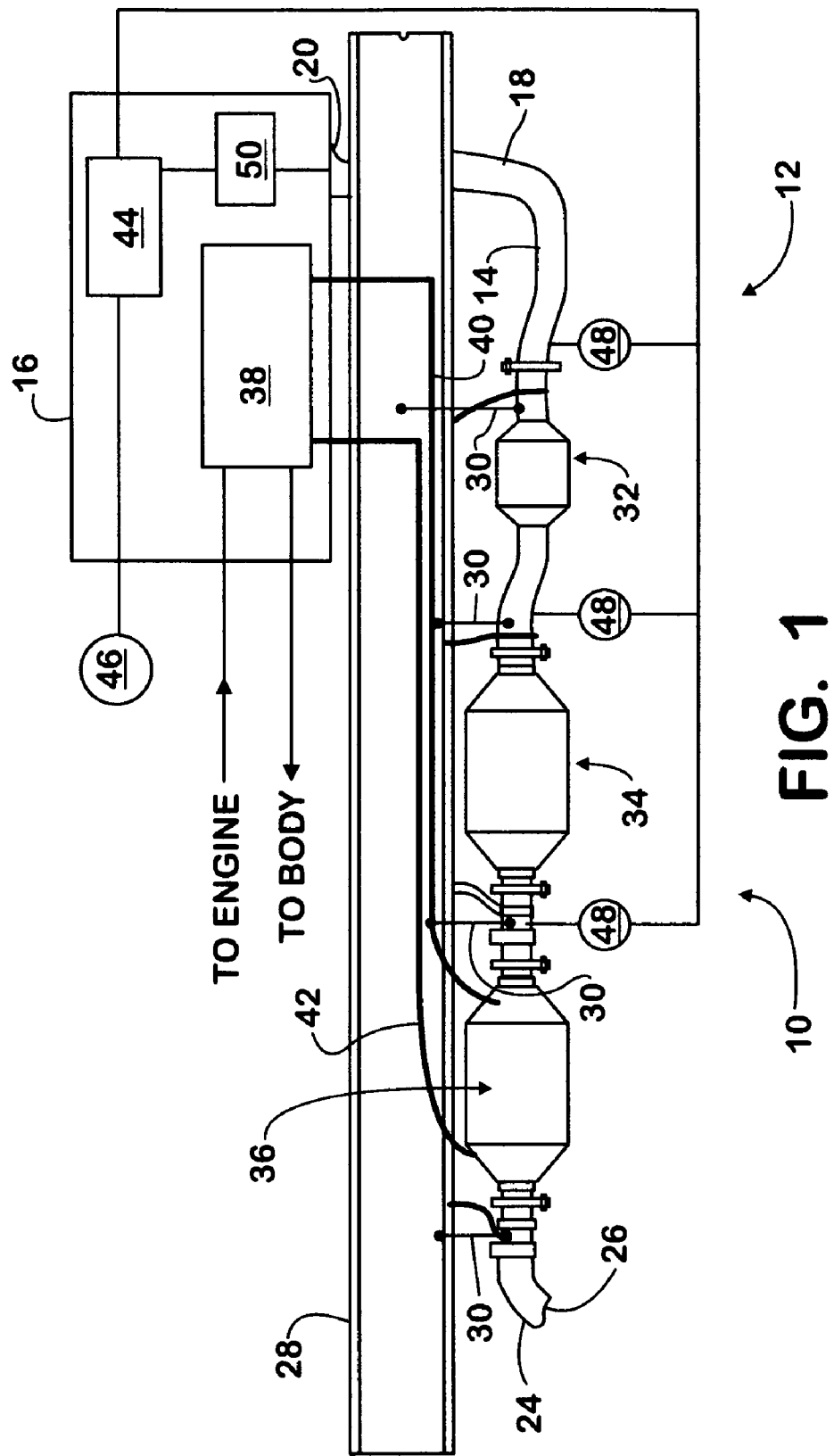
FIG. 1 is a plan view of an exhaust system having an associated heating system of the present invention.

Referring now to FIG. 1, a heating system assembly is depicted generally at 10, and is disposed on an exhaust system assembly, depicted generally at 12. The heating system 10 is configured for recovering waste heat from exhaust gases passing through the exhaust system assembly 12. While the following description is directed to a heating system assembly 10 for use with buses, it is contemplated that this heating system can be used with other vehicles.

The exhaust system assembly 12 forms an exhaust gas passageway 14 for gases emitted from an engine 16. The passageway 14 is formed with an exhaust inlet pipe 18, having an inlet 20 connected to an exhaust outlet (not shown) of the engine 16, and an exhaust outlet pipe 24, having an outlet 26 for venting the exhaust gases to the atmosphere. The heating system assembly 10 is located downstream of the exhaust inlet pipe 18 and upstream of the exhaust outlet pipe 24 in the direction of flow of the exhaust gases.

The exhaust system assembly 12 is preferably mounted on a chassis member 28 using conventional mounting structures 30. The exhaust system assembly 12 preferably extends longitudinally along the length of the bus.

In the direction of flow of the exhaust gases, the exhaust system assembly 12 incorporates aftertreatment devices, and specifically, includes an oxidation catalyst member 32 and a particulate filter 34. The heating system assembly 10 includes the exhaust system assembly 12, and also includes an exhaust gas-to-coolant heat exchanger 36. The oxidation catalyst member 32 is a conventional flow-through device that oxidizes unburned fuel and oil to reduce harmful emissions. Further, the particulate filter 34 is a conventional filter that removes particulate from the exhaust gases. The heat exchanger 36 is disposed downstream of the particulate filter 34 and derives heat from the exhaust gases.

As is conventionally known, an engine cooling system 38 circulates water or other coolant through a series of channels cast into the engine block and cylinder head (not shown), surrounding the combustion chambers (not shown), to carry the heat away from the engine 16 through the bus body. The circulating fluid is used to heat the large interior compartment of the bus. However, with the conventional engine cooling system, the fluid is not heated until the engine 16 is warmed up, and once the engine is warmed up, the fluid may not be sufficiently heated by the engine to heat the interior compartment.

The engine cooling system 38 of the present heating system 10 includes an inlet conduit 40 configured for feeding fluid from the engine cooling system to the heat exchanger 36. An outlet conduit 42 extends from the heat exchanger 36 and feeds the fluid back to the engine cooling system 38. As the fluid passes through the heat exchanger 36, the fluid is heated. However, the amount of heat derived from the exhaust gases in the heat exchanger 36 may still not be sufficient to heat a large interior compartment, such as the interior compartment on a bus.

In the present heating system 10, the amount of heat transferred to the fluid at the heat exchanger 36 is increased by increasing the temperature of the exhaust gases. The exhaust gas temperature is increased by initiating a regeneration event.

A regeneration event is the periodic or continuous oxidation of collected particulate matter that is trapped in a filter during routine engine operation. For example, when the particulate filter 34 of the exhaust system 12 experiences a build-up of particulate matter, the particulate matter is oxidized to regenerate the filter. Passive regeneration does not require another heat source (other than normal operation of the engine) to regenerate, examples of which include a catalyst-coated particulate filter in which the initiation of regeneration depends on the exhaust temperature. Active or forced regeneration is the process by which an external source outside normal operation of the engine is used to regenerate the emission control system. Examples of forced regeneration are the use of exhaust fuel injection or the use of heating mechanisms on the particulate filter 34 to initiate oxidation of the collected particulate matter.

A regeneration event produces large amounts of heat, which increases the heat of the exhaust gases. In some instances, the heat produced by regeneration can cause damage to objects located near the exhaust outlet pipe. The present heating system 10 harnesses the excessive heat generated by the regeneration process and uses it in a productive way. The heat created during regeneration is captured by the heat exchanger 36 and is sent to the engine cooling system 38, as will be described below.

Upon start-up of the vehicle, various conditions and interlocks can be monitored by an engine controller unit (ECU) 44 or a body controller (not shown) to ensure that the overall conditions are favorable for the forced regeneration. An example of preferable conditions include that the transmission be in park, the parking break be set, and the operator verify that the outlet 26 is located a distance from any objects. Then, if conditions are favorable, forced regeneration is initiated by the operator, preferably with an input unit, such as a button or switch 46. Alternatively, the regeneration can be commanded automatically with sensors and logic-looking presets. When the engine ECU 44 receives the request to initiate the regeneration, the engine ECU inputs a predetermined revolutions-per-minute (RPM) high enough for the engine 16 to achieve a minimum threshold exhaust gas temperature that can sustain a regeneration event. For example, in one embodiment, a minimum of about 1300 to 1400 RPM is required to reach a minimum threshold temperature, however other ranges are contemplated. The predetermined number of RPM will differ depending on the type of engine 16 and the construction of the exhaust system 12.

At least one and preferably multiple temperature sensors 48 are associated with the exhaust system assembly 12. When the temperature sensors sense that the exhaust gas has reached a sufficient temperature, the engine ECU 44 initiates hydrocarbon dosing or fuel injection at the engine 16. For example, the minimum threshold temperature may be around 500-550 degrees Fahrenheit, however other temperature ranges are contemplated. The fuel is introduced at a fuel-dosing member, preferably a fuel injector 50 associated with the engine 16, but the fuel is not part of the engine combustion event. Instead, the fuel is oxidized in the oxidation catalyst member 32.

As a result of oxidizing the fuel, a forced regeneration event ensues at the particulate filter 34, producing large amounts of heat. The heat produced during the forced regeneration is captured by the heat exchanger 36. From the heat exchanger 36, the heat from the exhaust gases is used to heat the cooling fluid, which is carried to the engine cooling system 38 by the outlet conduit 42 where the heated cooling fluid is used to warm the engine 16. From the engine 16, the heated cooling fluid is circulated throughout the bus body to provide heat to the interior compartment.

This method provides adequate heat for a conventionally sized bus in as little as about 10-15 minutes. The average amount of time can also be reduced depending on the desired coolant temperature. Further, the ECU 44 can be programmed to automatically stop the regeneration event when the coolant reaches the desired temperature. While heat from the present heating system 10 is configured to supplement the heat conventionally derived directly from the engine 16, it is contemplated that the present heating system can completely substitute for the heat derived from the engine. Further, it is contemplated that the present heating system 10 can be used in combination with any other known heating systems. An advantage of the present heating system 10 is that the regeneration event is conducted on a routine basis when heat is needed. A regeneration event is generally recommended about once every 400 miles, depending on the duty cycle of the vehicle, to maintain the exhaust system 12. Thus, the present heating system 10 can initiate a regeneration event on a more frequent basis than the normal duty-cycle of the vehicle if the normal duty-cycle of the vehicle is such that an automatic regeneration is difficult to attain.

Further, since a regeneration event generally occurs automatically when a backpressure is sensed across the particulate filter 34, the present heating system 10 can be used to alleviate the backpressure and conduct regeneration in a controlled environment. For example, if an operator initiates a regeneration event to warm the vehicle once every day, the vehicle is unlikely to regenerate again during that day's operation. Thus, the operator can take steps towards conducting regeneration in a controlled environment. Further, the operator can take steps towards preventing regeneration from occurring in an uncontrolled environment.

While particular embodiments of the present heating system have been shown and described, it will be appreciated by those skilled in the art that changes and modifications may be made thereto without departing from the invention in its broader aspects and as set forth in the following claims.

We claim:

1. A heating system for use on an exhaust system having an exhaust gas passageway to emit exhaust gases from an engine to an outlet, the engine having a cooling system to circulate a cooling fluid to and from the engine, comprising:
   a fuel-dosing member for dosing fuel to the exhaust system to trigger a regeneration event;
   a particulate filter located on the exhaust gas passageway downstream of the engine;
   an oxidation catalyst member located upstream from said particulate filter on the exhaust gas passageway, wherein said oxidation catalyst member oxidizes said fuel dosed to increase the temperature of the exhaust gases, wherein the increased temperature causes a regeneration event at said particulate filter, said regeneration event further increasing the temperature of said exhaust gases;
   an outlet of the exhaust gas passageway downstream of said oxidation catalyst member;
   a heat exchanger located downstream of said particulate filter on the exhaust gas passageway and located between said oxidation catalyst and said outlet, said heat exchanger for capturing heat from the exhaust gases associated with said regeneration event;
   an inlet conduit fluidly connecting said heat exchanger with the engine and configured for circulating the cooling fluid from the engine to said heat exchanger where the cooling fluid is heated;
   an outlet conduit fluidly connecting said heat exchanger with the engine and configured for circulating the heated cooling fluid from the heat exchanger back to the engine;
   an engine outlet conduit fluidly connected to said inlet conduit for delivering the heated cooling fluid from said heat exchanger throughout the vehicle body to heat an interior compartment of the vehicle; and
   an engine inlet conduit fluidly connected to said engine outlet conduit for returning the cooling fluid to the engine.

2. The heating system of claim 1 wherein said regeneration event is the oxidation of collected particulate matter that is trapped at said particulate filter.

3. The heating system of claim 1 further comprising an engine controller unit associated with the engine, wherein said engine controller unit initiates fuel-dosing at said fuel-dosing member to initiate said regeneration event.

4. The heating system of claim 3 wherein an operator initiates said engine controller unit to activate fuel-dosing with an input unit.

5. The heating system of claim 3 wherein said engine controller activates fuel-dosing to initiate said regeneration event automatically.

6. The heating system of claim 3 wherein said engine controller unit commands the engine to attain a revolutions-per-minute high enough for the engine to achieve a minimum threshold exhaust gas temperature that can sustain a regeneration event.

7. The heating system of claim 6 wherein said minimum threshold exhaust gas temperature is around 500-550 degrees Fahrenheit.

8. The heating system of claim 6 wherein said revolutions-per-minute of the engine is around 1300 to 1400.

9. The heating system of claim 1 wherein the heated cooling fluid is circulated from said heat exchanger through said outlet conduit to the engine, and from the engine throughout a bus body.

10. The heating system of claim 1 wherein at least one temperature sensor is located along the exhaust gas passageway.

11. The heating system of claim 1 wherein said fuel-dosing member is a fuel injector associated with the engine, wherein said fuel is not combusted at the engine.

12. A heating system for use on a vehicle having an exhaust system with an exhaust gas passageway to emit exhaust gases from an engine to an outlet, the engine having a cooling system to circulate a cooling fluid to and from the engine, comprising:
   a fuel-dosing member for dosing fuel to the exhaust system to trigger a regeneration event;
   an oxidation catalyst member located downstream of the engine on the exhaust gas passageway;
   a particulate filter located downstream of said oxidation catalyst member on the exhaust gas passageway;
   an outlet of the exhaust gas passageway downstream of said particulate filter;
   a heat exchanger located on the exhaust gas passageway downstream of said particulate filter and between said outlet and said particulate filter;
   an inlet conduit fluidly connecting said heat exchanger with the engine and configured for circulating the cooling fluid from the engine to said heat exchanger where the cooling fluid is heated;
   an outlet conduit fluidly connecting said heat exchanger with the engine and configured for circulating the heated cooling fluid from the heat exchanger back to the engine;
   an engine outlet conduit fluidly connected to said inlet conduit for delivering the heated cooling fluid from said heat exchanger throughout the vehicle body to heat an interior compartment of the vehicle;
   an engine inlet conduit fluidly connected to said engine outlet conduit for returning the cooling fluid to the engine; and
   at least one temperature sensor located on the exhaust gas passageway for measuring the temperature of said exhaust gases, wherein when a minimum threshold exhaust gas temperature is measured, the engine initiates dosing of said fuel from said fuel-dosing member, wherein said fuel flows directly from said fuel-dosing member through the exhaust gas passageway to said oxidation catalyst to trigger a regeneration event at said particulate filter;
   wherein said heat exchanger captures the heat of the exhaust gases associated with said regeneration event to heat the vehicle.

13. The heating system of claim 12 wherein said regeneration event is the oxidation of collected particulate matter that is trapped at said particulate filter.

14. The heating system of claim 12 further comprising an engine controller unit associated with the engine, wherein said engine controller unit initiates fuel-dosing at said fuel-dosing member to initiate said regeneration event.

15. The heating system of claim 14 wherein an operator initiates said engine controller unit to activate fuel-dosing with an input unit.

16. The heating system of claim 14 wherein said engine controller activates fuel-dosing to initiate said regeneration event automatically.

17. The heating system of claim 14 wherein said engine controller unit commands the engine to attain a revolutions-per-minute high enough for the engine to achieve an exhaust gas temperature above a minimum threshold to sustain regeneration.

18. The heating system of claim 17 wherein said revolutions-per-minute of the engine is around 1300 to 1400.

19. The heating system of claim 12 wherein the heated cooling fluid is circulated from said heat exchanger through said outlet conduit to the engine, and from the engine throughout a bus body.

20. A heating system for use on a vehicle having an exhaust system with an exhaust gas passageway to emit exhaust gases from an engine to an outlet, the engine having a cooling system to circulate a cooling fluid to and from the engine, comprising:
- an engine controller unit associated with the engine for initiating a regeneration event;
- a fuel-dosing member associated with the engine and controlled by said engine controller for dosing fuel;
- a particulate filter located on the exhaust gas passageway downstream of the engine;
- an oxidation catalyst member located upstream from said particulate filter on the exhaust gas passageway, wherein said oxidation catalyst member oxidizes fuel dosed from said fuel-dosing member to increase the temperature of the exhaust gases, wherein said fuel flows directly from said fuel-dosing member through the exhaust gas passageway to said oxidation catalyst, and wherein the increased temperature causes said regeneration event at said particulate filter, said regeneration event further increasing the temperature of said exhaust gases;
- an outlet of the exhaust gas passageway;
- a heat exchanger located on the exhaust gas passageway and located downstream of said particulate filter between said outlet and said particulate filter, said heat exchanger for capturing heat from the exhaust gases associated with said regeneration event;
- an inlet conduit fluidly connecting said heat exchanger with the engine and configured for circulating the cooling fluid from the engine to said heat exchanger where the cooling fluid is heated;
- an outlet conduit fluidly connecting said heat exchanger with the engine and configured for circulating the heated cooling fluid from the heat exchanger back to the engine;
- an engine outlet conduit fluidly connected to said inlet conduit for delivering the heated cooling fluid from said heat exchanger throughout the vehicle body to heat an interior compartment of the vehicle; and
- an engine inlet conduit fluidly connected to said engine outlet conduit for returning the cooling fluid to the engine.

* * * * *